ALEXANDER HEARST, OF PEORIA, ILLINOIS.

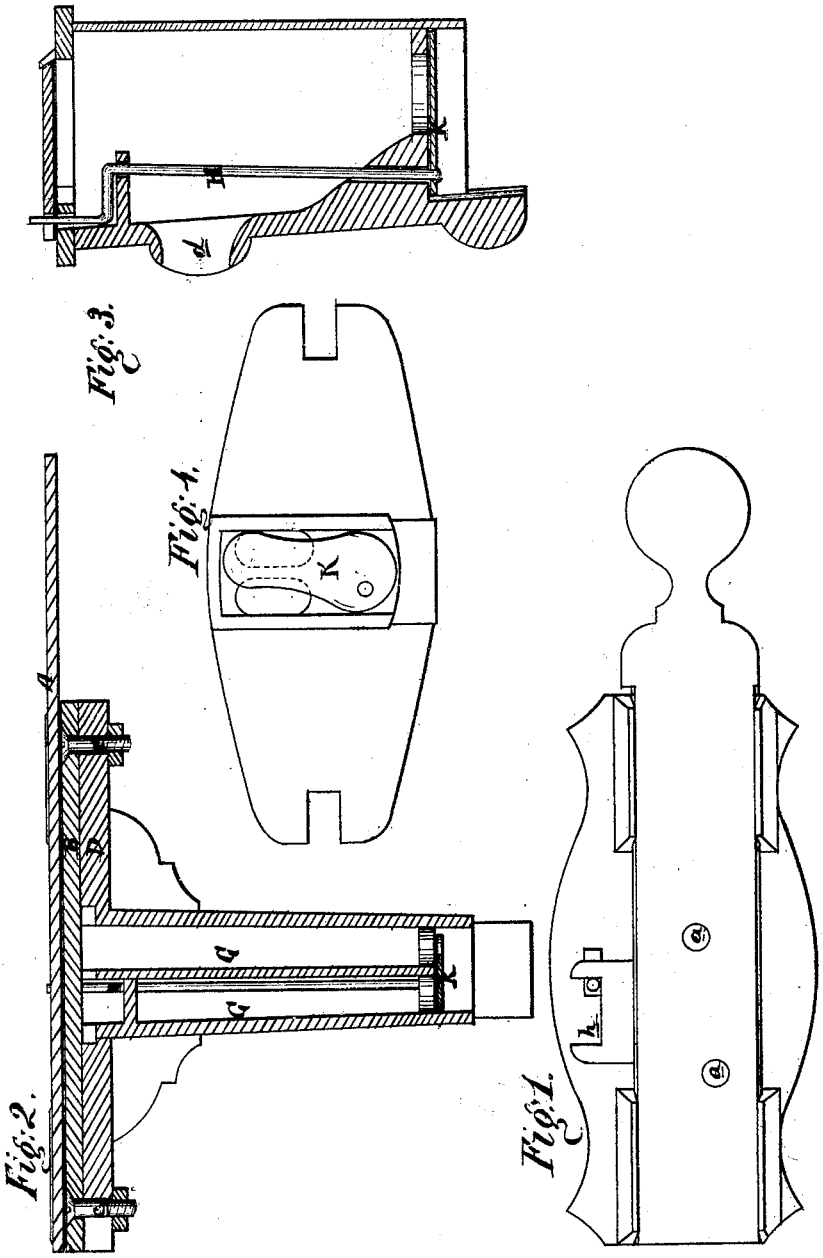

Letters Patent No. 86,226, dated January 26, 1869.

IMPROVEMENT IN CORN-PLANTERS.

The Schedule referred to in these Letters Patent and making part of the same.

*To all whom it may concern:*

Be it known that I, ALEXANDER HEARST, of Peoria, in the county of Peoria, and State of Illinois, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1, of the drawings, is a representation of a plan view of my device;

Figure 2 is a sectional view thereof; and

Figures 3 and 4 are details.

The nature of my invention consists in constructing a perforated sliding-bar, to be placed immediately below or in the bottom of the hopper of a seed-planter, and connecting therewith suitable conduits, with openings therein, together with an operating-rod and valve, so adjusted and arranged that the seed may be conducted from the hopper into either conduit, and from thence to the ground, at the will of the operator, while, at the same time, the operator is enabled to see, from the driver's seat, the seed as it falls, and hence, be ready to regulate any imperfection or irregularity in the dropping of the same.

The letter A, of the drawings, represents a flat sliding-bar, adjusted in or under flanches, in the manner shown, and Letters $a$ are openings therein.

Letter B is a plate, upon which the flanches, above mentioned, are formed. It is attached to the crown-piece of the conduits, hereinafter mentioned, by means of bolts and screws, adjusted in slots, as shown. It is open at the point immediately below the opening $a$, and has also an opening, through which the end of the operating-rod passes, as hereinafter described.

Letter D is the crown-piece of my seed-dropper, setting immediately below the plate B, as shown, and to which it is connected and held by means of the bolts and nuts above mentioned, and shown on the drawings by letters $c$. This crown-piece is provided with openings on its top corresponding with those in plate B, above mentioned.

The letters G are conduits, leading from the crown-piece to the ground, as shown; and Letters $d$ are openings therein, through which the operator, from the driver's seat, is enabled to view the seed as it passes downward.

The letter H is the operating-rod, adjusted in the manner represented, passing from a point near the bottom of the conduits to and above the plate B, where it is moved and operated by means of the jaws $h$, attached to the side of the sliding-bar A, as shown on fig. 1.

The letter K is a valve or cut-off, attached firmly to the lower end of rod H, and is moved thereby in such manner as to open or close the openings at the bottoms of the conduits, at the will of the operator, or with each movement of the sliding-bar A, when the same is operated by machinery, the operation being to close one conduit at the moment the other is opened.

I usually prefer to cast the crown-piece and conduits in one piece, with a partition between the conduits, as shown on fig. 2; but I do not wish to confine myself to that specific mode of manufacture.

What I claim as my invention, and desire to secure by Letters Patent, is—

A seed-dropper, having sliding-bar A, plate B, crown-piece D, conduits G, rod H, valve K, and openings $d$, constructed, arranged, and operating substantially as herein specified.

In testimony that I claim the above, I have hereunto subscribed my name, in the presence of two witnesses.

ALEXANDER HEARST.

Witnesses:
FRANK PURPLE,
GEO. PUTERBAUGH.